United States Patent Office 3,229,068
Patented Jan. 11, 1966

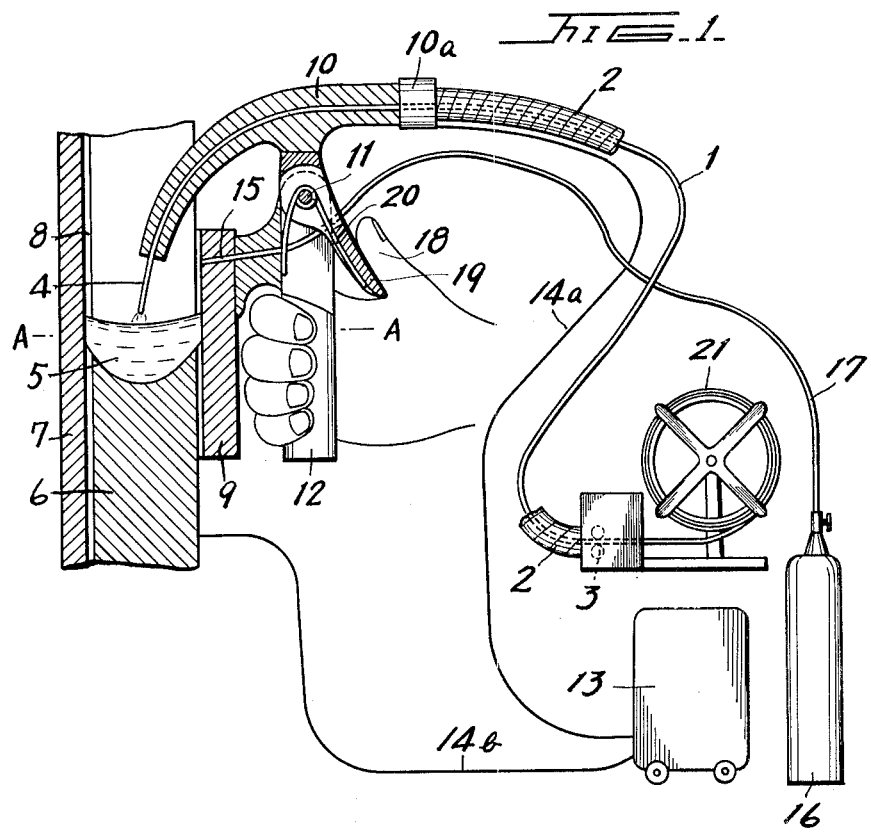
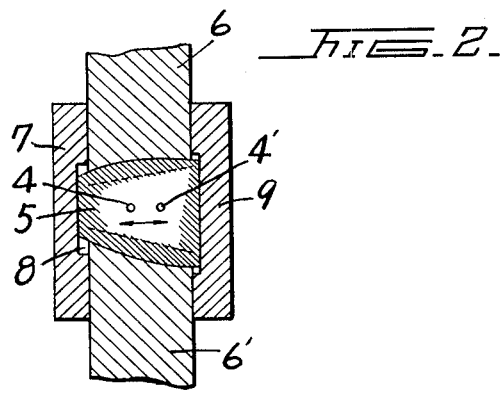

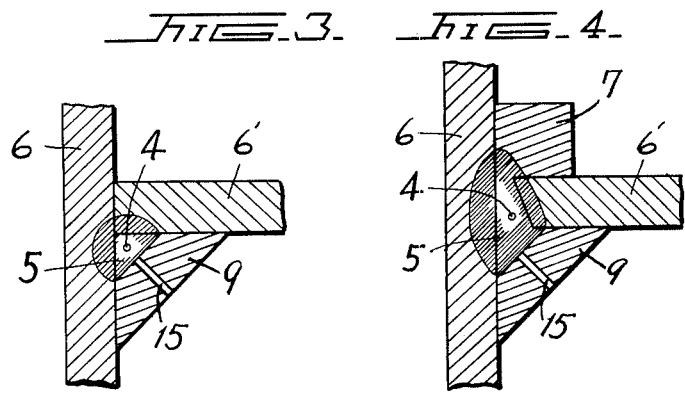
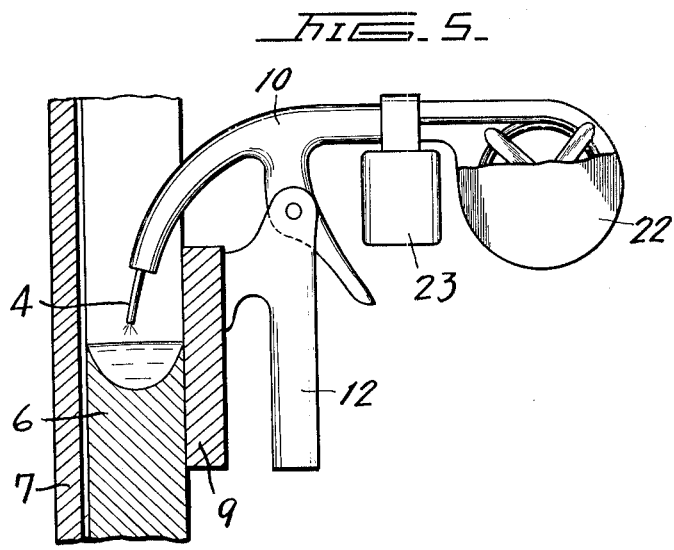

3,229,068
VERTICAL WELDING MACHINE
Mitsuo Hasegawa, 3 4-chome, Chitose Dohri,
Toyonaka, Ohsaka-fu, Japan
Filed Aug. 4, 1964, Ser. No. 387,333
Claims priority, application Japan, Aug. 8, 1963,
38/40,704
4 Claims. (Cl. 219—126)

The present invention relates to an improved vertical welding machine, and more particularly to a vertical welding machine of the type in which a wire electrode is continuously fed through a welding torch to a vertical or somewhat inclined seam line between two work pieces being welded together.

For arc-welding a vertical or somewhat inclined seam line between two work pieces being welded together by utilizing prior art arc welding machines, the welding operation has been mostly carried out by hand using a shielded electrode, but such a prior art welding operation requires a high degree of skill, and if high welding current is employed, particular care must be exercised to prevent molten metal or molten slag from flowing of the seam.

Furthermore, in order to carry to the vertical welding process automatically, the so-called electro slag welding process has been proposed. In the electro slag welding process copper leakage prevention blocks are employed for preventing molten metal from flowing out of the molten pool. A vertical automatic arc-welding process using copper blocks as mentioned above with inert gas or $CO_2$ gas shielding may also be used. However, prior art automatic vertical welding machines are generally of large types and heavy weight which are inevitably inconvenient in handling and costly in production. Such drawbacks associated with the prior art vertical welding machines have prevented such machines from being widely employed in the vertical welding process.

Therefore, a main object of the present invention is to provide an improved vertical welding machine having a simpler construction which eliminates the above drawbacks of prior art welding machines and which can be easily manipulated by any unskilled operator for carrying out the welding operation with a high rate and efficiency.

According to the present invention, a semi-automatic arc-welding machine is provided in which a wire shaped electrode is automatically and continuously supplied from a wire reel to a welding torch by means of an automatic feeding means. The semi-automatic welding machine also comprises a molten metal and slag leakage prevention member operatively connected to said welding torch and adapted to move along a vertical or inclined seam line between the work pieces being welded together, and means for simultaneously moving said welding torch and leakage prevention members so that said leakage prevention member may move along a seam line between the work pieces and effectively prevent molten metal and slag from flowing out of a molten pool formed over the seam line.

The above and other objects and advantages of the present invention will be more readily apparent from the following description when read in connection with the accompanying drawings in which:

FIG. 1 is a schematic side elevational view of one form of the semi-automatic welding machine of the present invention in which a welding torch and a leakage prevention member are mechanically connected to each other for simultaneous movement along a vertical or inclined seam line between two work pieces a portion only of one work piece being shown in cross-section;

FIG. 2 is a fragmentary cross-sectional view taken along the line A—A of FIG. 1 showing the area in the vicinity of the molten pool shown in FIG. 1;

FIGS. 3 and 4 are cross-sectional views showing relative positioning of the work pieces and said leakage prevention member when vertical fillet welding and vertical T-type welding processes are carried out respectively with a semi-automatic welding machine of the present invention; and FIG. 5 is a schematic side elevational view of another embodiment of the semi-automatic welding machine of the present invention in which the welding torch has a wire reel and a wire feed means integral therewith.

FIG. 1 shows an instance in which the semi-automatic welding machine of the present invention is employed to weld a seam line formed by two work pieces which are vertically disposed having a suitable space therebetween. These pieces are designed with numeral references 6 and 6', respectively (FIG. 2) and in FIG. 1 only one work piece 6 is illustrated. A metallic, preferably copper, back plate 7 is provided in contact with the rear side of the two work pieces 6 and 6' so as to cover the gap or seam line between the work pieces. A molten pool 5 is formed over the seam line between the work pieces and a wire electrode 1 is adapted to be continuously fed through a welding torch 10 to the molten pool 5.

The wire electrode 1 is supplied at a suitable constant rate from a wire reel 21 through a flexible conduit 2 connected to the welding torch 10 by means of the wire feed means 3. Welding current is supplied from a power source 13 through a flexible conductor 14a connected to a connector 10a on the welding torch 10 and through a flexible conductor 14b connected to the work piece 6.

The wire feed means 3 is adapted to feed the wire electrode 1 at the same rate at which the tip 4 of the electrode 1 is consumed by the action of the heat from the welding arc and thus maintains constant the length of the space between the electrode tip 4 and the molten pool on the work pieces or the length of the generated arc. Such a function of the wire feed means 3 is the same as that of the wire feed means in the conventional semi-automatic submerged arc welding machine or the gas-shielded arc-welding machine.

The back plate 7 which is disposed at the rear side of the work pieces 6 and 6' is generally formed of copper and the back plate 7 is not necessarily required to be in direct contact with the work pieces 6 and 6' and in some cases a slight clearance 8 may be left between the back plate 7 and work pieces 6 and 6' as seen in FIGS. 1 and 2. If a first pass in the vertical welding process has previously laid in the bottom of the seam line the back plate 7 may be eliminated.

The welding torch 10 has an operative arm 19 which is electrically insulated from the body portion of the torch 10. The arm 19 may be pivoted about a pin 11 laterally extending through the handle 12 of a leakage prevention member 9 disposed in front of the work pieces 6 and 6', and, is normally urged upwardly and outwardly and held in position against the welding torch body by the elastic force of a spring 20 disposed around the pin 11.

The leakage prevention member 9 is usually formed of a high thermally conductive material such as copper and may be water cooled as desired. However, when some types of metals are processed, it may not be possible to use copper for the leakage prevention member 9 in which case the leakage prevention member may be formed of a non-metallic material such as graphite or glass.

The vertical welding operation by the use of the novel welding machine of the present invention may be carried out as follows:

The wire electrode 1 is firstly fed at a suitable constant rate from the welding torch 10 to the welding point by means of the wire feed means 3 while an arc is generated between the electrode tip 4 and molten pool 5, and as the electrode 1 melts away the height of the molten pool 5 increases accordingly and, therefore, the entire welding torch 10 and the leakage prevention member 9 are gradually moved up by the handle 12 along the seam line in proportion of the rise in height of the molten pool 5. Thus, since the metal of the molten pool 5 is confined in the well like recess encircled by the two work pieces 6, 6', the back plate 7 and leakage prevention member 9, the molten metal or slag may be positively prevented from flowing out of the recess. Additionally, argon gas or $CO_2$ gas may be discharged from a gas cylinder 16 through a pipe 17 connected thereto into an opening 15 formed in the leakage prevention member 9, and the molten metal of the molten pool 5 shielded against oxidizing or nitrizing action. However, such a protective shielding gas is not necessarily required to be ejected out of the opening 15 of the leakage prevention member 9 and instead the protective gas may be ejected through the area around a contact tip (not shown) or the shielding gas may be eliminated and the molten pool allowed to become covered with flux or slag.

An experimental operation was carried out by the use of the novel welding machine of the present invention and the results of such an experiment are given below.

When the thickness of the work pieces 6 and 6' was 20 mm. or less, if the electrode tip 4 was fed toward the center portion of the molten pool 5 and the arc length and arc current were set at appropriate values, sufficient penetration was obtained along the full thickness of the work pieces to obtain a sufficient welded seam line. However, when the thickness of the work pieces was 30 mm. or more, sufficient penetration was not obtained along the full thickness of the pieces with the fixed electrode tip. In such case, the operator pushed the operative arm 19 with the thumb 13 of his one hand gripping the welding torch 10 in order to cause a periodic rocking motion of the arm 19 around the pin 11 within a limited angular distance. In this way, the electrode tip 4 was moved in accordance with the angular movement of the arm 19 along the full thickness of the work pieces whereby the work pieces having a thickness more than 30 mm. were sufficiently welded together without any skipping or lack of fusion.

FIGS. 3 and 4 schematically illustrate the instances in which the novel welding machine is employed for vertical fillet welding and vertical T-shape welding processes, respectively. When the welding machine is employed for the vertical fillet welding process as shown in FIG. 3, one work piece 6' is disposed at a right angle with respect to the other work piece 6 and a molten pool 5 is formed between one side of the work piece 6', the adjacent one side of the other piece 6 and a leakage prevention member 9 which is adapted to move in unison with the welding torch 10.

In the vertical T-shape welding process as shown in FIG. 4, one work piece 6' is disposed at a right angle with and spaced from the other work piece 6 and a molten pool 5 is formed in the area between one end portion of the work piece 6' and the adjacent side of the other work piece 6 and such a molten pool is covered by a backing plate 7 disposed to one side of the pool and a leakage prevention member 9 disposed to the other side of the pool 5 and movable in unison with the welding torch 10. In these figures, numeral 4 designates the approximate position of the electrode tip 4 in the molten pool 5 and numeral 15 designates a shielding gas discharge opening formed in the leakage prevention member 9 and which opening is the same as that shown in FIG. 1.

In the semi-automatic vertical welding machine in FIG. 1, the wire electrode reel 21 and wire feed means 3 are positioned remotely from the welding torch 10 and the wire feed means 3 and welding torch 10 are connected to each other by means of the flexible conduit tube 2, but the wire reel 21 and wire feed means need not be disposed remotely from the welding torch, but instead, may be directly connected to or formed integral with the welding torch thereby to make the construction of the welding machine compact. An example of a more compact welding machine construction is shown in FIG. 5 and in this embodiment the welding torch 10 to which the leakage prevention member 9 is mechanically connected through the handle 12 has a small size wire reel 22, and a wire feed means 23 including a small size wire feed motor, a reduction gear, and a pair of feed rolls integrally connected thereto thereby to provide a small size compact vertical welding machine which is easier to handle. And if a counter weight (not shown) is operatively connected through any suitable means to the welding torch so as to balance the weight of the welding torch, the operator may be relieved from fatigue to a great extent.

In the foregoing the invention has been explained in detail in connection with the cases in which the novel vertical welding machine is applied to the submerged arc welding process or the welding process employing shielding gases or shielding flux, but the invention is not limited in its application to the these welding processes and instead the same can be similarly applied to the electro-slag welding process in which the wire electrode is continuously fed. And as mentioned hereinabove, the term "vertical" does not mean the strictly geometric verticality, but includes any angles which slightly deviate from the true verticality and also in such deviated angles the novel welding machine can effectively prevent molten metal and slag from flowing out.

While two preferred embodiments of the invention have been shown and described in detail it will be understood that they are for the purpose of illustration only and are not to be taken as a definition of the scope of the invention, reference being had for this purpose to the appended claims.

What is claimed is:

1. In a welding machine for welding together work pieces along a generally upwardly directed seam which includes a welding torch having a passage extending therethrough, and means for feeding a welding electrode through said passage and into conductive contact with the work pieces, the combination of a leakage prevention member connected with said torch, and means connected with said leakage prevention member and said torch for simultaneously moving them along said seam, said means being adapted to hold said leakage prevention member against the work pieces in front of said seam to prevent the flow of molten metal during the course of welding, said leakage prevention member being provided with a passage for directing a shielding gas into the seam and over the molten electrode.

2. In a welding machine for welding together workpieces along a generally upwardly directed seam which includes a welding torch having a passage extending therethrough, and means for feeding a welding electrode through said passage and into conductive contact with the workpieces, the combination of a leakage prevention member, a handle connected with said leakage prevention member for holding it against said workpieces in front of said seam to prevent the flow of molten metal therefrom during the course of welding, said torch being pivoted at the top of said handle, an arm connected with said torch for rocking said torch with respect to said handle, and spring means engaging said arm and operative to limit the arc in which said torch may be rocked.

3. In a welding machine for welding together workpieces along a generally upwardly directed seam, a torch having a passage extending therethrough, means for feeding a welding electrode through said passage and into conductive contact with the workpieces, a handle, said torch being pivoted to an upper portion of said handle, means carried on the torch and connected with the handle for rocking said torch relative to said handle, a leakage prevention member connected to said handle and having a portion extending adjacent said handle spaced therefrom, said handle being adapted for simultaneously moving said torch and said leakage prevention member along said seam with the leakage prevention member positioned against the workpieces in front of said seam to prevent the flow of molten metal therefrom during the course of welding.

4. In a welding machine for welding together workpieces along a generally upwardly directed seam and including a welding torch having a passage extending therethrough, means for feeding a welding electrode through said passage and into conductive contact with the workpieces, a leakage prevention member adapted to abut on the workpieces in front of said seam to prevent the flow of molten metal therefrom during the course of welding, a handle connected with said leakage prevention member and said torch for moving them simultaneously upwardly along said seam, said handle being generally coextensive with said leakage prevention member and adjacently spaced therefrom, said torch being pivoted to an upper portion of said handle, and means carried on the torch and connected with the handle for rocking said torch through a limited arc with respect to said handle, said means including an arm connected to the torch and pivoted on said handle, and a spring engaging said arm and normally biasing it in one direction, said torch being rocked by swinging said arm in an opposite direction; said leakage prevention member having a passage extending therethrough for directing a shielding gas into the seam and over the molten metal.

References Cited by the Examiner
UNITED STATES PATENTS

| | | | |
|---|---|---|---|
| 2,390,149 | 12/1945 | Hopper | 219—130 |
| 2,395,723 | 2/1946 | Chmielewski | 219—137 |
| 2,673,916 | 3/1954 | Meyer | 219—126 |
| 3,038,990 | 6/1962 | Cotter et al. | 219—130 |

RICHARD M. WOOD, *Primary Examiner.*